(12) United States Patent
Paul et al.

(10) Patent No.: US 9,111,136 B2
(45) Date of Patent: Aug. 18, 2015

(54) SYSTEM AND METHOD FOR VEHICLE OCCUPANCY DETECTION USING SMART ILLUMINATION

(71) Applicant: Xerox Corporation, Norwalk, CT (US)

(72) Inventors: Peter Paul, Webster, NY (US); Abu Islam, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 420 days.

(21) Appl. No.: 13/677,548

(22) Filed: Nov. 15, 2012

(65) Prior Publication Data

US 2013/0278768 A1    Oct. 24, 2013

Related U.S. Application Data

(60) Provisional application No. 61/637,375, filed on Apr. 24, 2012.

(51) Int. Cl.
| | |
|---|---|
| *H04N 7/18* | (2006.01) |
| *G06K 9/00* | (2006.01) |
| *G08G 1/017* | (2006.01) |
| *G07B 15/06* | (2011.01) |
| *G07C 5/00* | (2006.01) |

(52) U.S. Cl.
CPC .......... *G06K 9/00369* (2013.01); *G08G 1/0175* (2013.01); *G07B 15/063* (2013.01); *G07C 5/008* (2013.01)

(58) Field of Classification Search
USPC ......... 348/148, 149, 153, 159, 142, 143, 118, 348/116, 115, 114, 14.07, 47, 48, 50, 52, 348/201, 526, 719, 837; 701/1, 29.6, 49, 701/444, 69; 703/6, 8; 382/103, 104, 107, 382/254
See application file for complete search history.

(56) References Cited

U.S. PATENT DOCUMENTS

| | | | |
|---|---|---|---|
| 5,915,032 A * | 6/1999 | Look | 382/100 |
| 6,314,369 B1 * | 11/2001 | Ito et al. | 701/421 |
| 7,034,683 B2 * | 4/2006 | Ghazarian | 340/568.1 |
| 7,055,639 B2 | 6/2006 | Kiribayashi | |
| 7,460,940 B2 * | 12/2008 | Larsson et al. | 701/49 |
| 7,786,897 B2 | 8/2010 | Alves | |
| 7,881,914 B2 * | 2/2011 | Trotta et al. | 703/6 |
| 8,013,760 B2 | 9/2011 | Turnock et al. | |
| 2002/0130953 A1 * | 9/2002 | Riconda et al. | 348/115 |
| 2002/0140687 A1 * | 10/2002 | Takeda | 345/204 |
| 2003/0028294 A1 * | 2/2003 | Yanagi | 701/21 |
| 2004/0015278 A1 * | 1/2004 | Gordon et al. | 701/33 |

(Continued)

*Primary Examiner* — Jefferey Harold
*Assistant Examiner* — Mustafizur Rahman
(74) *Attorney, Agent, or Firm* — Fay Sharpe LLP

(57) ABSTRACT

A multi-view imaging system for Vehicle Occupancy Detection (VOD) including a gantry mounted camera and illuminator to view the front seat of vehicles, and a roadside mounted camera and illuminator to view the rear seat of vehicles. The system controls the illuminator units to preserve/maximize bulb life, thus reducing the service cost of the system. In one embodiment, a target vehicle's license plate is read. If the vehicle is on a pre-approved list to use the HOV lane, then no further interrogation of the vehicle is performed. If the vehicle is not on the pre-approved list, then the front seats are interrogated by a camera and illuminator located on an overhead gantry as the vehicle continues down the highway. If the front seat analysis indicates that the passenger seat is not occupied, then the system interrogates the rear seats using a separate camera and illuminator located on the roadside.

20 Claims, 4 Drawing Sheets

(56) References Cited

U.S. PATENT DOCUMENTS

| | | | |
|---|---|---|---|
| 2004/0107028 A1* | 6/2004 | Catalano | 701/2 |
| 2006/0004488 A1* | 1/2006 | Sugiyama et al. | 700/245 |
| 2006/0227212 A1* | 10/2006 | Schedivy | 348/148 |
| 2008/0235082 A1* | 9/2008 | Zanotti et al. | 705/13 |
| 2009/0098815 A1* | 4/2009 | Hotary | 454/75 |
| 2009/0121897 A1* | 5/2009 | Muhlethaler et al. | 340/908 |
| 2009/0273720 A1* | 11/2009 | Tanaka | 348/790 |
| 2009/0284598 A1* | 11/2009 | Busch et al. | 348/148 |
| 2010/0110094 A1* | 5/2010 | Kamibayashi et al. | 345/589 |
| 2010/0138080 A1* | 6/2010 | Nazione et al. | 701/2 |
| 2010/0204876 A1* | 8/2010 | Comeau et al. | 701/32 |
| 2010/0228471 A1* | 9/2010 | Nagase | 701/200 |
| 2010/0302371 A1* | 12/2010 | Abrams | 348/149 |
| 2010/0302974 A1* | 12/2010 | Niiyama et al. | 370/254 |
| 2011/0004397 A1* | 1/2011 | Nagase | 701/119 |
| 2011/0295697 A1* | 12/2011 | Boston et al. | 705/14.68 |

* cited by examiner

SYSTEM AND METHOD FOR VEHICLE OCCUPANCY DETECTION USING SMART ILLUMINATION

CROSS REFERENCE TO RELATED PATENTS AND APPLICATIONS

This application claims priority to and the benefit of the filing date of U.S. Provisional Patent Application Ser. No. 61/637,375, filed Apr. 24, 2012, which application is hereby incorporated by reference.

BACKGROUND

High Occupancy Vehicle lanes (HOV) and High Occupancy Tolling lanes (HOT) are used in highway systems to relieve congestion and increase the human throughput through the highway system. These are often referred to as "car pool" lanes, since the idea is that drivers will drive together in a single vehicle, thus taking vehicles off the road, yet still allowing people to get to their destinations. HOT lanes area more recent element to highway systems. In HOT lanes, single occupant vehicles are allowed to use the HOV lane if they are willing to pay a toll.

A continuing issue with HOV/HOT lanes is enforcement of the HOV/HOT rules of use for the lanes. Typical violation rates are in the 20% to 40% range, while rates have been reported up to 65% on certain highways at certain commute times. The current enforcement regime is manual enforcement by police officers at the side of the road. Police officer based enforcement results in an enforcement rate below 10%. The enforcement revenue generated from police officer based enforcement is a very small percentage of the total potential revenue.

Prior attempts at automated or semi-automated enforcement generally used an imaging system located at a single location, often from the roadside, showed poor performance due to poor line of sight into vehicles, used very costly specialized imaging hardware, and disregarded issues related to serviceability. For example, an illuminator is often used to illuminate the interior of vehicles to enable the imaging hardware to detect the presence or absence of occupants in the passenger seats. Illuminator serviceability is important since, due to the high volume of traffic, life stress is placed on the illuminator bulb. Further, in some installations the traffic lane must be shut down in order to perform service on the illuminator, such as changing the bulb.

BRIEF DESCRIPTION

A multi-view imaging system for Vehicle Occupancy Detection (VOD) including a gantry mounted camera and illuminator to view the front seat of vehicles, and a roadside mounted camera and illuminator to view the rear seat of vehicles. The disclosure includes features which intelligently control the illuminator units in order to preserve/maximize bulb life, thus reducing the service cost of the system. In one embodiment, a target vehicle's license plate is read. If the vehicle is on a pre-approved list to use the HOV lane, then no further interrogation of the vehicle is performed. If the vehicle is not on the pre-approved list, then the front seats are interrogated by a camera and illuminator located on an overhead gantry as the vehicle continues down the highway. If the front seat analysis indicates that the passenger seat is not occupied, then the system interrogates the rear seats using a separate camera and illuminator located on the roadside. If a violation is suspected by the system, an evidence package consisting of front seat, rear seat, and license plate imagery is either sent down the road to the roadside police officers who might further manually interrogate the vehicle to determine occupancy, or to police officers in a back office who might carefully interrogate the evidence package and decide to issue a ticket. In another embodiment, the information is sent to a back office which consists of tolling operations and a toll is assessed on the owner of the vehicle based on vehicle occupancy (HOT application).

In accordance with one aspect, a system for vehicle occupancy detection comprises at least one vehicle identification scanner for determining the identification of a vehicle, at least one imaging unit for capturing image data used to determine whether a passenger is present in the vehicle, and a central processing unit in communication with the at least vehicle identification scanner and the at least imaging unit. The at least one vehicle identification scanner is adapted to transmit information relating to a scanned vehicle to the central processing unit. The central processing unit is configured to compare the information received from the vehicle identification scanner to a list of pre-approved vehicles and prevent operation of the at least one imaging unit if a match is found and, if no match is found, trigger the at least one imaging unit to capture image data pertaining to passenger areas of the vehicle to be used to determine whether a passenger is present in the vehicle.

The at least one vehicle identification scanner includes a license plate scanner or an identification tag scanner. The at least one imaging unit includes a camera and an illuminator. At least one of the vehicle identification scanner and the at least one imaging unit is mountable to an overhead gantry extending over a lane of a roadway. The vehicle identification scanner is spaced apart from the at least one imaging unit a distance such that a vehicle can be scanned by the vehicle identification scanner prior to approaching the at least one imaging unit. The distance can be, for example, between about 30 feet and 200 feet.

The system can further comprise at least one device for sensing a vehicle, the device configured to trigger at least one of the vehicle identification scanner and imaging unit. The at least one device for sensing a vehicle can include a wire loop. The system can also include a communication interface for transmitting information from at least one of the vehicle identification scanner and the imaging unit to a third party.

In one embodiment, the system can include a first imaging unit and a second imaging unit, each imaging unit including an illuminator, wherein the first and second imaging units are spaced apart from each other, and wherein the first imaging unit is activated when no match to the approved list is found to detect whether a passenger is in a first passenger area of the vehicle, and wherein the second imaging unit is activated to determine if a passenger is in a second passenger area of the vehicle. The distance can be, for example, between about 10 feet and 200 feet. The second imaging unit can be activated only if no passenger is detected by the first imaging unit.

The system can include at least two imaging units, each of the at least two imaging units and the vehicle identification scanner being spaced apart from each other along a lane of a highway along a direction of travel such that a vehicle passes the vehicle identification scanner prior to the imaging units.

The system can further include at least two imaging units, the vehicle identification scanner and one of the imaging units being located at a common position along a lane of a highway, the other imaging unit being spaced downstream from the vehicle identification scanner and the imaging unit along a direction of travel of the highway such that a vehicle passes the vehicle identification scanner prior to the other imaging unit.

In accordance with another aspect, a method of detecting occupants of a vehicle comprising the steps of identifying a vehicle, comparing the vehicle based on its identity to a list of vehicles on a preapproved list and, if so, taking no further action, otherwise scanning a first occupant space of the vehicle to detect an occupant other than a driver and, if so, taking no further action, otherwise scanning a second occupant space of the vehicle to detect an occupant other than a driver.

The method can also include generating an evidence package including data obtained in at least one of the steps. The identifying step can include scanning at least one of a license plate or an identification tag including identification information. The scanning a first occupancy space can include capturing an image of a front seat of the vehicle using a first imaging device including an illuminator. The scanning a second occupancy space can include capturing an image of a rear seat of the vehicle using a second imaging device including an illuminator. The first imaging device can include an overhead mounted imaging device and the second imaging device can include a side mounted imaging device. The method can also include transmitting the evidence package to a remote location for review.

DETAILED DESCRIPTION

Figure 1:
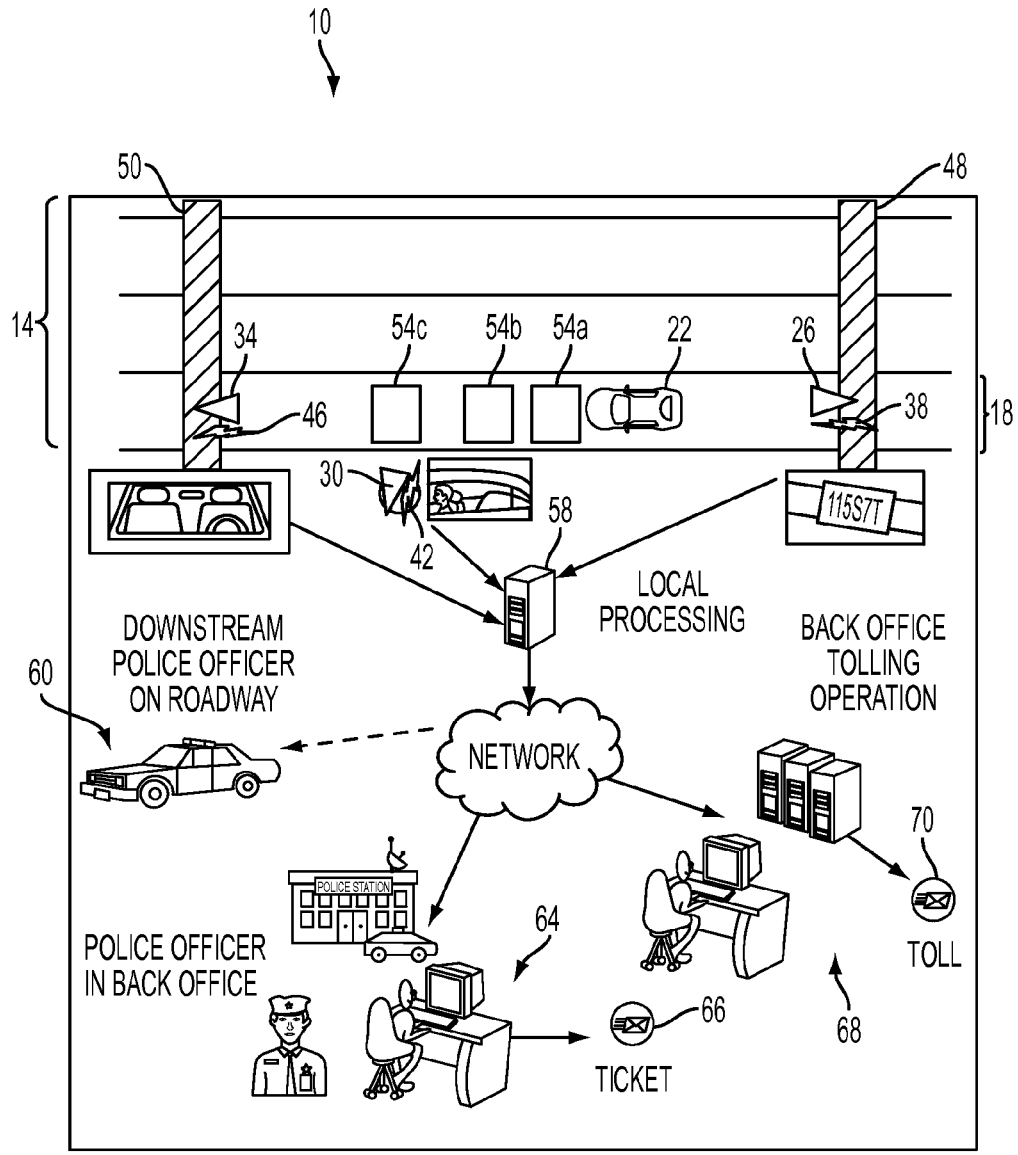
FIG. 1 is diagram of an exemplary system in accordance with present disclosure.

With reference to FIG. 1, a vehicle occupancy detection system is illustrated and identified generally by reference numeral 10. The upper portion of the figure depicts one direction of a divided highway 14. Vehicles travel from right to left in FIG. 1. The lowermost lane is an HOV lane 18 and a vehicle 22 is depicted travelling in the HOV lane 18.

The system 10 of the illustrated exemplary embodiment generally comprises three cameras 26, 30 and 34 depicted by respective triangular symbols, and three illuminators 38, 42 and 46 depicted by the respective lightning bolt symbols. Camera 26 and illuminator 38 are supported on an overhead gantry 48 extending over the HOV lane 18 and provide a rear view of the vehicle 22 in order to detect the vehicle's license plate. An example license plate image is shown in the figure below the camera 26 and illuminator 38. Note that camera 26 may be a color camera and the illuminator 38 may be of visible light as that not only license plate information is recorded, but vehicle color and/or other identifying features of the vehicle 22 can also be recorded. In another embodiment, the license plate reading camera 26 and illuminator 38 can be replaced by an RFID transponder reading system to determine the identity of the vehicle 22.

Camera 30 and illuminator 42 in the middle of the FIG. 1 can be mounted by the roadside and are used to determine rear seat occupancy. Camera 34 and illuminator 46 on the left side of FIG. 1 are used to determine front seat occupancy and are supported on a separate overhead gantry 50 extending over the HOV lane 18. Images of rear seat occupancy and front seat occupancy are depicted below their respective cameras. The rectangular boxes 54a, 54b and 54c depicted in the HOV lane 18 in front of the vehicle 22 represent ground loops buried in the roadway for use in triggering the cameras/illuminators as will be described in more detail below.

The camera/illuminator pairs and ground loops communicate with a central processing unit (CPU) 58. It will be appreciated that these components can be in wired or wireless communication with the CPU 58 using any of a wide variety of wired and/or wireless communication protocols. In the illustrated embodiment, the CPU 58 is local to the other components of the system 10 and, as such, local processing as depicted in the FIG. 1. This can be in the form of what is known as a "lane controller" wherein the system architecture includes a network where data may be transmitted back and forth between the components and the CPU 58. The data can also be transmitted to police officers 60 on the downstream roadway, police officers in a back office 64 for the issuance of HOV lane violation citations (e.g., tickets 66), or the data may go to back office tolling operations 68 where tolls 70 are assessed and the customers' accounts are debited.

Figure 2:
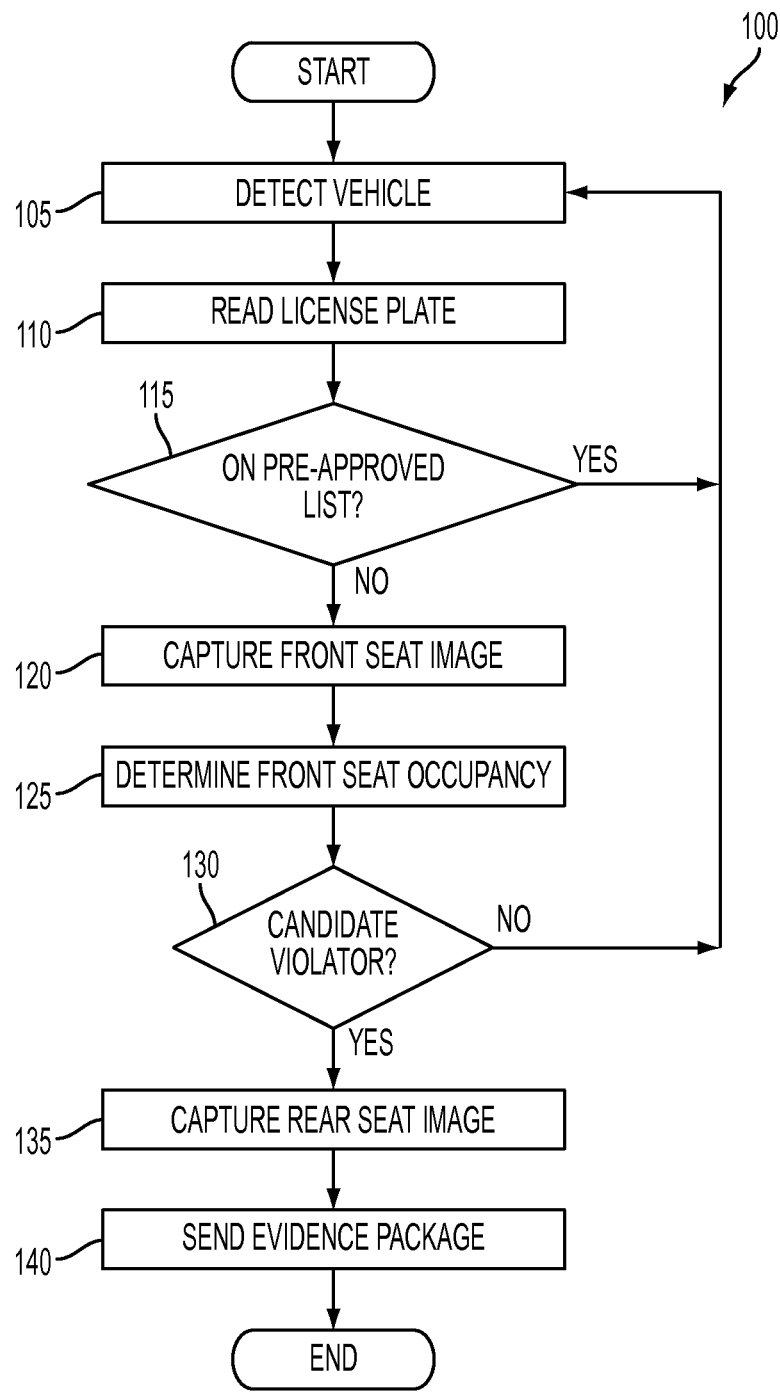
FIG. 2 is a flow chart of an exemplary method in accordance with the present disclosure.

FIG. 2 depicts a flowchart of an exemplary method 100 setting forth the sequential operation of the system 10 of FIG. 1. The method starts process step 105 when a vehicle enters the occupancy detection zone. As the vehicle drives over a first ground loop (e.g., ground loop 54a) and is detected, camera 26 and illuminator 38 are triggered in process step 110 to capture an image used for automatic license plate reading. This image may also be used to identify the vehicle by its color and rough size and shape. Other identifying features of the vehicle may also be ascertained via this initial image. In an alternate embodiment an image signature may be used to identify the vehicle. In another alternative embodiment, an RFID transponder detection system may be used to identify the vehicle.

Once the vehicle is identified by the system using either license plate information or other methods (e.g. an RFID transponder), in process step 115 the vehicle identity is compared to a list of pre-approved list users of the HOV lane. This could include people who have paid a fee to use the HOV/HOT lanes, people who are driving an "eco-friendly" vehicle model such as a Toyota Prius, and service vehicles such as police cars and fire trucks. If the vehicle is determined to be on the pre-approved list, then the process reverts to process step 105 until the next vehicle is detected. If the vehicle is determined not to be on the pre-approved list, the method continues to process step 120.

As the vehicle proceeds to the next trigger ground loop (e.g., 54b), if the vehicle has been determined not to be on the pre-approved list, then the gantry based camera 34 and illuminator 46 are triggered in process step 120 to capture a front seat image through the windshield of the vehicle. As will be appreciated, if the vehicle was determined to be on the pre-approved list, then the gantry camera 34 and illuminator 46 would not be triggered, saving life cycles on the illuminator.

In process step 125, automatic occupancy detection methods are used on the front seat image to determine if the front passenger is occupied or not. Commonly assigned U.S. Patent Application Publication No. 20120147194, which is hereby incorporated herein by reference in its entirety, sets forth an exemplary occupancy detection method. In process step 130, if the front passenger seat is not occupied, then the vehicle is declared a "Candidate Violator" and the method continues to process step 135. If the front passenger seat is occupied then the vehicle is not a candidate violator, the system does not waste illuminator life cycles on the side mounted rear seat illuminator 42, and the method returns to process step 105 to wait for the next vehicle. If the vehicle is a candidate violator, then in process step 135 the side mounted camera 30 and illuminator 42 are triggered when the vehicle proceeds to the side mounted camera trigger point (e.g. ground loop 54c). Once the rear seat image is captured, the rear seat image, the front seat image, and the license plate and other identifying data are transmitted in process step 140 to either a downstream police officer, a police officer in the back office, and/or a back office tolling station. The final occupancy determination can be performed remotely.

Using the method 100, both the gantry mounted front seat viewing illuminator 46 and the side mounted rear seat viewing illuminator 42 are not engaged when the vehicle is on the pre-approved vehicle list. In addition, the side mounted rear seat viewing illuminator 42 is not engaged when the front passenger seat is occupied as automatically determined using the front seat image obtained by camera 34. This saves significant life cycles on the illuminators 42 and 46 as compared to simply triggering all of the cameras/illuminators and then processing the data.

It should be appreciated that the occupancy detection illuminators (the illuminators 46 on the left hand side gantry in FIG. 1 and the illuminator 42 in the side mount position in FIG. 1) are generally of much higher power than that of the license plate reading illuminator 38. As such, their life is typically much shorter. Typical numbers are 250-1000 J/flash for an occupancy detection illuminator, and 17 J/flash or less for a license plate reading illuminator, for example. The occupancy detection illuminator is much larger since its illumination must penetrate the windshield and then is reflected off of items within the vehicle that have a much lower reflectance than a typical license plate. The reflected light must then return through the windshield back to the camera. This is almost a factor of $2^4$ reduction. Published xenon flashtube bulb life is a factor of 5× to 10× in life for every factor of 2 in power used. Thus, the license plate reading illuminator should last 625× to 10000× the life of the occupancy detection illuminators. Put another way, at the power levels used for occupancy detection, the life of the illuminators may be stressed. This disclosure sets forth an improved method for extending the life of the occupancy illuminators by only triggering them when required based on information gathered for each vehicle.

It should also be appreciated that the life of the illuminators is very important for serviceability of the occupancy detection system. In order to replace the xenon flash bulb of either of the gantry mounted illuminators, the lane must typically be closed to traffic to allow technicians access to the illuminators. This is a highly costly endeavor and should only be attempted at most once per every six months. Aspects of the disclosure prolong illuminator bulb life thus making service intervals longer, lowering service costs.

Figure 3:
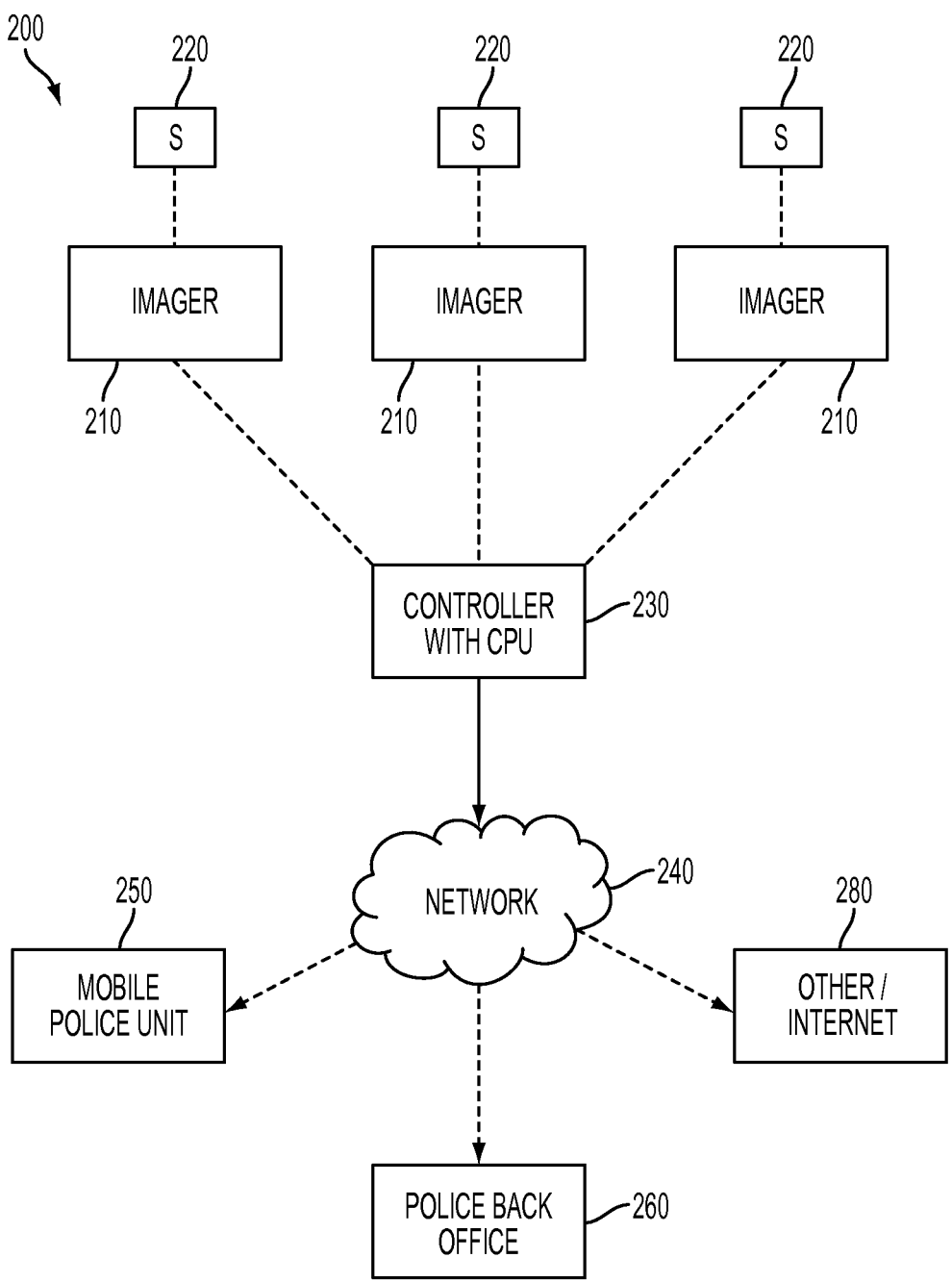
FIG. 3 is a block diagram of another exemplary system in accordance with the present disclosure.

Turning to FIG. 3, a schematic block diagram of an exemplary system 200 is illustrated. System 200 is similar to system 10 of FIG. 1 and includes a plurality of imaging units 210 that can include both a camera or other image capture device and an illuminator such as a flash. It will be appreciated that each imaging unit can contain a different type of camera and/or illuminator. For example, one imaging unit may include an optical camera and optical flash, while another imaging unit includes an infrared camera and infrared flash. The imaging units 210 can be mounted to overhead gantrys or the like, or to posts or other roadside supports in the manner previously described. It is also possible to mount one or more of the imaging units to a vehicle and/or a vehicle mounted boom or mast. In addition, in some applications it may be desirable to separate the illuminator from the camera, or to provide an auxiliary illuminator spaced apart from the imaging unit configured to work in conjunction with the imaging unit.

Each imaging unit 210 is connected via a wired or wireless connection to a respective sensor 220. Sensor 220 can be any suitable sensor for triggering an imaging unit. In some embodiments the sensor can be a wire loop configured to sense vehicle presence via inductance. In other embodiments the sensor can be an electronic eye or other motion sensing device configured to sense movement in a HOV lane. It will be appreciated that the sensor 220 can be remote from the imaging unit or included as part of the imaging unit, depending on the type of sensor employed.

Each imaging unit 210 is connected via a wired or wireless connection to a controller 230 that includes a CPU for controlling the various operations of the imaging units, and for performing processing steps related to operation of the system 200. The controller 230 will generally be local to the imaging units 210 to allow for rapid communication therebetween and reduce system lag. To this end, it will be appreciated that the controller 230 can be integrated into one of the imaging units 210.

The controller 230 is connected to a network 240 for communicating data generated by the imaging units 210 to remote locations such as a mobile police unit 250, a police back office 260, or other location including the internet and/or remote servers containing information regarding a pre-approved HOV list. Accordingly, the controller 230 can communicate information regarding vehicles determined to be violators to police for further processing, while updating the preapproved list of vehicles for comparison to detected vehicles.

Figure 4:
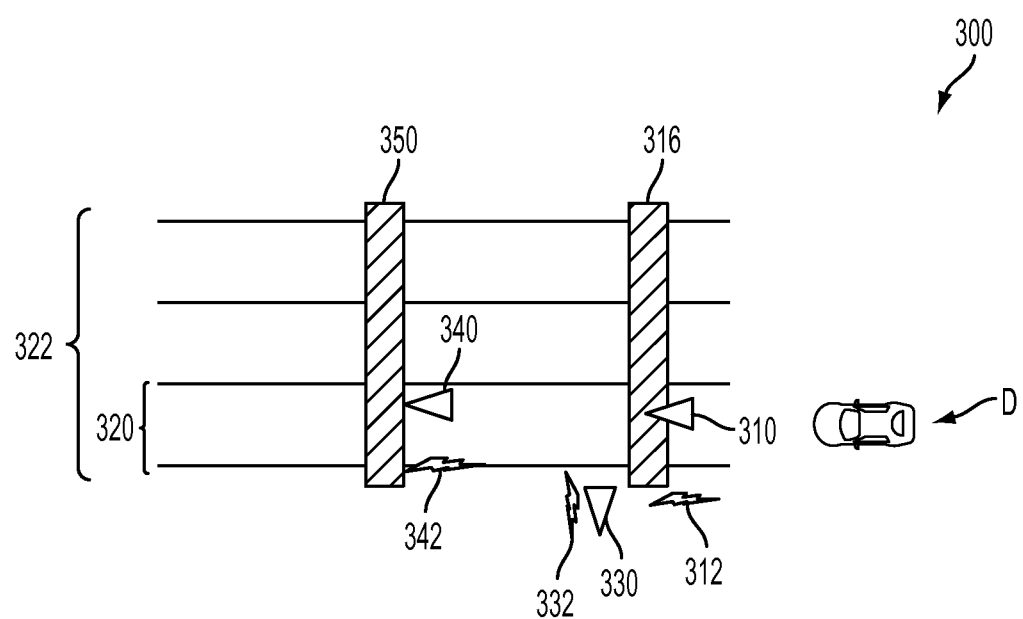
FIG. 4 is a schematic illustration of another arrangement of an exemplary system in accordance with the present disclosure.

Turning to FIG. 4, an alternative configuration or arrangement of the imaging units is illustrated in system 300. In this embodiment, a first camera 310 and illuminator 312 are mounted to an overhead gantry 316 over an HOV lane 320 of a highway 322. The first camera 310 is configured to examine a front license plate of an approaching vehicle and to transmit the plate information to a controller for checking against a pre-approved list. The camera 310 and controller are configured to identify a potential violating vehicle before the vehicle advances beyond the camera in the direction of travel (indicated by arrow D).

A second camera 330 and illuminator 332 is positioned near or adjacent to the first camera 310 and configured to capture an image of rear seat occupants of a vehicle determined not to be on the pre-approved list. A third camera 340 and illuminator 342 is mounted on a second overhead gantry 350 spaced apart from the first gantry down the road on the direction of travel. Like the previously described embodiments, the second and third cameras are only activated if a vehicle is not identified as being on a pre-approved list and/or a passenger is not detected in the vehicle.

In this embodiment, the first and second cameras 310 and 330 and associated illuminators 312 and 332 are approximately aligned at axis perpendicular to HOV lane 320. Accordingly, the components can both be mounted on the gantry 316. In another embodiment, the components could be mounted to a boom of a vehicle configured to extend above and/or over the HOV lane 320. Camera 340 and illuminator 342 could be supported on a second vehicle mounted boom making the entire system 300.

In alternate embodiments, the overhead gantry mounted cameras 26, 34, 310, 340 and the overhead gantry mounted illuminators 38, 46, 312, 342 may be located on poles or other structures at the side of the road with generally the same camera field of view and illuminator coverage area as if they were mounted on overhead gantries. Such poles or structures can be located adjacent to the HOV lane, in approximately the same location as the gantries.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for vehicle occupancy detection comprising:
   at least one vehicle identification scanner for determining the identification of a vehicle;
   at least one imaging unit for capturing image data used to determine whether a passenger is present in the vehicle; and
   a central processing unit in communication with the at least one vehicle identification scanner and the at least one imaging unit;
   wherein the at least one vehicle identification scanner is adapted to transmit information relating to a scanned vehicle to the central processing unit;
   wherein the central processing unit is configured to:
   compare the information received from the vehicle identification scanner to a list of pre-approved vehicles and prevent operation of the at least one imaging unit if a match is found and, if no match is found, enables the trigger of the at least one imaging unit to capture image data pertaining to passenger areas of the vehicle to be used to determine whether a passenger is present in the vehicle.

2. A system as set forth in claim 1, wherein the at least one vehicle identification scanner includes a license plate scanner or an identification tag scanner.

3. A system as set forth in claim 1, wherein the at least one imaging unit includes a camera and an illuminator.

4. A system as set forth in claim 1, wherein at least one of the vehicle identification scanner and the at least one imaging unit is mountable to an overhead gantry extending over a lane of a roadway.

5. A system as set forth in claim 4, wherein the vehicle identification scanner is spaced apart from the at least one imaging unit a distance such that a vehicle can be scanned by the vehicle identification scanner prior to approaching the at least one imaging unit.

6. A system as set forth in claim 5, wherein the distance is between 30 feet and 200 feet.

7. A system as set forth in claim 1, further comprising at least one device for sensing a vehicle, the device configured to trigger at least one of the vehicle identification scanner and imaging unit.

8. A system as set forth in claim 7, wherein the at least one device for sensing a vehicle includes a wire loop.

9. A system as set forth in claim 1, further comprising a communication interface for transmitting information from at least one of the vehicle identification scanner and the imaging unit to a third party.

10. A system as set forth in claim 1, further comprising a first imaging unit and a second imaging unit, each imaging unit including an illuminator, wherein the first and second imaging units are spaced apart from each other, and wherein the first imaging unit is activated when no match is found to said list of pre-approved vehicles to detect whether a passenger is in a first passenger area of the vehicle, and wherein the second imaging unit is activated to determine if a passenger is in a second passenger area of the vehicle.

11. A system as set forth in claim 10, wherein the second imaging unit is activated only if no passenger is detected by the first imaging unit.

12. A system as set forth in claim 1, further comprising at least two imaging units, each of the at least two imaging units and the vehicle identification scanner being spaced apart from each other along a lane of a highway along a direction of travel such that a vehicle passes the vehicle identification scanner prior to the imaging units.

13. A system as set forth in claim 1, further comprising at least two imaging units, the vehicle identification scanner and one of the imaging units being located at a common position along a lane of a highway, the other imaging unit being spaced downstream from the vehicle identification scanner and the imaging unit along a direction of travel of the highway such that a vehicle passes the vehicle identification scanner prior to the other imaging unit.

14. A method of detecting occupants of a vehicle comprising the steps of:
   providing at least one vehicle identification scanner for determining the identification of a vehicle;
   providing at least one imaging unit for capturing image data used to determine whether a passenger is present in the vehicle
   identifying a vehicle using the at least one vehicle identification scanner;
   comparing the vehicle based on its identity to a list of vehicles on a preapproved list and, if so, preventing operation of the at least one imaging unit, otherwise
   scanning a first occupant space of the vehicle with the at least one vehicle identification scanner to detect an occupant other than a driver and, if so, taking no further action, otherwise
   scanning a second occupant space of the vehicle with the at least one vehicle identification scanner to detect an occupant other than a driver.

15. A method as set forth in claim 14, further comprising generating an evidence package including data obtained in at least one of the steps set forth in claim 14.

16. A method as set forth in claim 14, wherein the identifying step includes scanning at least one of a license plate or an identification tag including identification information.

17. A method as set forth in claim 14, wherein the scanning a first occupancy space includes capturing an image of a front seat of the vehicle using a first imaging unit including an illuminator.

18. A method as set forth in claim 17, wherein the scanning a second occupancy space includes capturing an image of a rear seat of the vehicle using a second imaging unit including an illuminator.

19. A method as set forth in claim 18, wherein the first imaging device unit includes a side mounted imaging unit and the second imaging device unit includes an overhead mounted imaging unit.

20. A method as set forth in claim 14, further comprising transmitting the evidence package to a remote location for review.

* * * * *